(12) United States Patent
Mishra

(10) Patent No.: US 6,655,575 B2
(45) Date of Patent: Dec. 2, 2003

(54) SUPERPLASTIC FORMING OF MICRO COMPONENTS

(75) Inventor: Rajiv S. Mishra, Rolla, MO (US)

(73) Assignee: The Curators of University of Missouri, Columbia, MO (US)

( * ) Notice: Subject to any disclaimer, the term of this patent is extended or adjusted under 35 U.S.C. 154(b) by 44 days.

(21) Appl. No.: 10/123,326

(22) Filed: Apr. 16, 2002

(65) Prior Publication Data

US 2003/0192939 A1 Oct. 16, 2003

(51) Int. Cl.⁷ .......................... B23K 20/12; B23K 1/20; B21D 21/00
(52) U.S. Cl. ................. 228/112.1; 228/113; 228/141.1; 228/173.1
(58) Field of Search ................... 228/103, 112.1–114.5, 228/141.1, 173.1, 173.2, 262.1, 262.5, 2.1, 2.3, 155, 156, 199, 200; 72/262

(56) References Cited

U.S. PATENT DOCUMENTS

| | | | | |
|---|---|---|---|---|
| 4,087,038 A | * | 5/1978 | Yagi | 228/114.5 |
| 4,299,111 A | * | 11/1981 | Fayal et al. | 72/342.2 |
| 4,582,242 A | * | 4/1986 | Spindler | 228/113 |
| 4,952,331 A | * | 8/1990 | Okimoto et al. | 252/62.54 |
| 4,958,678 A | * | 9/1990 | Kawamura et al. | 164/461 |
| 5,279,349 A | * | 1/1994 | Horimura | 164/120 |
| 5,324,368 A | | 6/1994 | Masumoto et al. | |
| 5,460,317 A | | 10/1995 | Thomas et al. | |
| 5,718,366 A | | 2/1998 | Colligan | |
| 5,794,835 A | | 8/1998 | Colligan et al. | |
| 6,053,391 A | | 4/2000 | Heideman et al. | |
| 6,138,895 A | | 10/2000 | Oelgoetz et al. | |
| 6,143,412 A | * | 11/2000 | Schueller et al. | 428/408 |
| 6,227,430 B1 | | 5/2001 | Rosen et al. | |
| 6,257,479 B1 | | 7/2001 | Litwinski et al. | |
| 6,298,962 B1 | | 10/2001 | Kato et al. | |
| 6,299,050 B1 | | 10/2001 | Okamura et al. | |
| 6,302,315 B1 | | 10/2001 | Thompson | |
| 6,398,883 B1 | | 6/2002 | Forrest et al. | |
| 2002/0079351 A1 | | 6/2002 | Mishra et al. | |

FOREIGN PATENT DOCUMENTS

| | | | |
|---|---|---|---|
| GB | 1 355 502 | * | 6/1974 |
| GB | 2 198 384 A | * | 6/1988 |
| JP | 07265966 A | * | 10/1995 |
| JP | 411047859 A | | 2/1999 |
| JP | 02001047260 A | | 2/2001 |
| WO | wo 93/10935 | | 6/1993 |

OTHER PUBLICATIONS

Mishra, et al., High Strain Rate Superplasticity in a Friction Stir Processed 7075 Al Alloy, Scripta mater. 42 (2000) 163–168.
Mishra, et al., Friction Stir Processing: a New Grain Refinement Technique to Achieve High Strain Superplasticity in Commercial Alloys, Superplasticity in Advanced Materials, ICSAM–2000 Materials Science Forum, 357–3 (2001) 507.
Mahoney et al., Properties of Friction–Stir–Welded 7075 T651 Aluminum, Metallurgical and Materials Transactions, vol. 29A, Jul. 1998, pp. 1955–1964.
Rhodes et al., Effects of Friction Stir Welding on Microstructure of 7075 Aluminum, Scripta Materialia, vol. 36, No. 1, 1997, pp. 69–75.
Inoue et al., Viscous Flow Deformation in Supercooled Liquid State of Bulk Amorphous $Zr_{55}Al_{10}Ni_5Cu_{30}$ Alloy, Materials Transactions, JIM, vol. 37, No. 6 (1996), pp. 1337 to 1341.
Saotome et al., Sperplastic Extrusion of Microgear Shaft of 10 $\mu$m in Module, Technical Information Service of Purdue University, Jun. 1999, pp. 126–129.

* cited by examiner

Primary Examiner—Tom Dunn
Assistant Examiner—Zidia Pittman

(57) ABSTRACT

A method for forming a miniaturized shaped component. Bulk superplastic material is contacted with a flat rotating surface of a rotating tool to frictionally heat the bulk superplastic material with the bulk superplastic material positioned between the flat rotating surface of the tool and a microfabricated tool die. The bulk superplastic material is forced into the microfabricated die once the bulk superplastic material is heated to a temperature between a glass transition temperature and a crystallization temperature.

29 Claims, 3 Drawing Sheets

SUPERPLASTIC FORMING OF MICRO COMPONENTS

BACKGROUND OF THE INVENTION

This invention relates to the formation of miniaturized shaped components such as components for microelectromechanical systems (MEMS) and nanoelectromechanical systems (NEMS).

Current technology for producing MEMS and NEMS devices is based mainly on silicon microfabrication techniques. Silicon, however, has relatively poor mechanical properties which rendered forming techniques difficult. New materials and fabrication techniques are need to produce micro components with greater reliability.

Nanostructured materials exhibit exceptional strength and fatigue properties, rendering them good candidates for high performance micro components. Fabrication is difficult, however, because conventional machining techniques available for larger components do not readily scale down for use with micro components.

Matsumoto et al. U.S. Pat. No. 5,324,368 disclosed a method for forming components from amorphous materials relying on fluid pressure as a deformation force and a furnace or oil bath to heat the material to be deformed.

Saotome et al., "Superplastic Extrusion of Microgear Shaft of 10 um in Module," Microsystem Technologies 6 (2000) 126–129, disclosed microextrusion of Al-78Zn, observing cavities, voiding, and surface roughness at higher strain rates.

SUMMARY OF THE INVENTION

There is a need for an improved method for making micro scale components including MEMS and NEMS components.

Briefly, therefore, the invention is directed to a method for forming a miniaturized shaped component. Bulk superplastic material is contacted with a flat rotating surface of a rotating tool to frictionally heat the bulk superplastic material with the bulk superplastic material positioned between the flat rotating surface of the tool and a microfabricated tool die. The bulk superplastic material is forced into the microfabricated die once the bulk superplastic material is heated to a temperature between a glass transition temperature and a crystallization temperature of the bulk superplastic material by moving the tool and die closer to each other with the bulk superplastic material therebetween to produce a miniaturized shaped component conforming to a shape of the microfabricated tool die.

The invention is also directed to a method for extruding a miniaturized cross-section component involving contacting bulk superplastic material with a flat rotating surface of a rotating tool to frictionally heat the bulk superplastic material with the bulk superplastic material positioned between the flat rotating surface of the tool and a microfabricated extrusion die. The bulk superplastic material is forced into the microfabricated extrusion die once the bulk superplastic material is heated to a superplastic temperature range to produce an extrusion with a miniaturized cross section.

In another aspect the invention is a method for forming a component of miniaturized cross section in which the bulk superplastic material is heated by contacting an encapsulating material which encapsulates the bulk superplastic material with a flat rotating surface of a rotating tool to frictionally heat the encapsulating material. This heats the bulk superplastic material, with the bulk superplastic material and encapsulating material positioned between the flat rotating surface of the tool and a microfabricated die. The bulk superplastic material is forced into the microfabricated die once the bulk superplastic material is heated to a temperature between a glass transition temperature and a crystallization temperature of the bulk superplastic material. This is achieved by moving the tool and die closer to each other with the bulk superplastic material therebetween and with the encapsulating material transmitting pressure from the tool to the bulk superplastic material to produce a shaped component of miniaturized cross section conforming to a shape of the microfabricated die.

Other objects and features will be in part apparent and in part pointed out hereinafter.

DETAILED DESCRIPTION OF THE PREFERRED EMBODIMENTS

Figure 1:
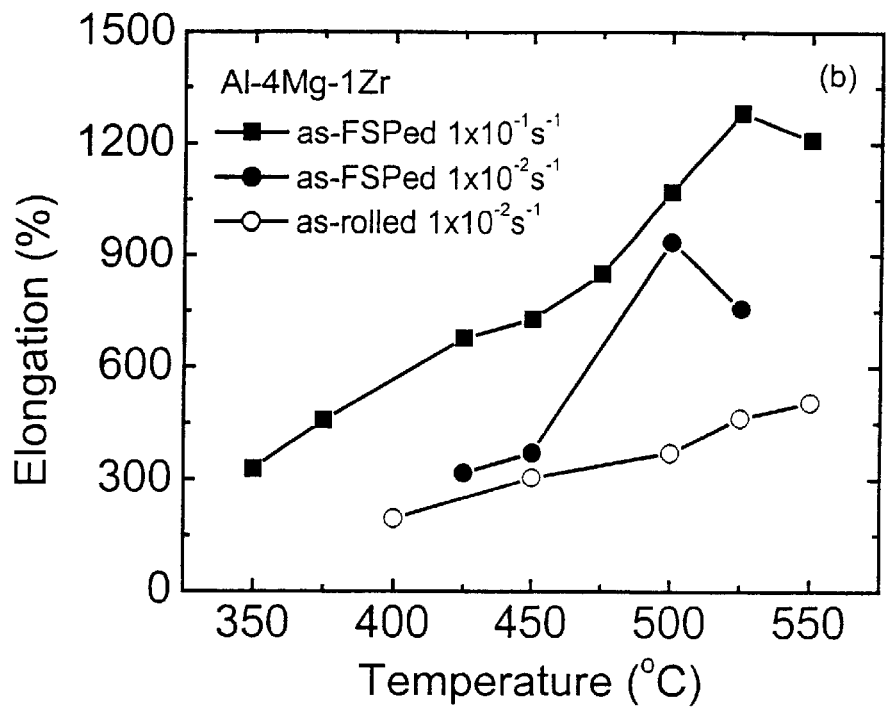
FIG. 1 is graphical presentation of elongation and temperature data for superplastic material of the type deformed in this invention.

Superplastic materials are those materials which exhibit superplasticity when heated to an appropriate temperature under the proper conditions. Superplasticity, generally, is the capacity of metal to undergo larger uniform plastic deformation without rupture. Structural superplasticity has been defined many ways, but for purposes of this description refers to the ability of a metal to undergo more than about 200% elongation under tension without rupturing. High strain rate superplasticity is defined as a minimum strain rate of $10^{-2}$ $S^{-1}$ (Glossary of Terms Used in Metallic Superplastic Materials, JIS-H-7007, p. 3, Japanese Standards Association, Tokyo, Japan (1995)). Among the bulk superplastic materials which are processed in accordance with this invention are aluminum alloys which have been processed to have superplastic properties, other alloys to which have been imparted nanocrystalline microstructure (average grain size less than 100 nanometers) by processes such as torsional strain (TS)-SePD as described by Mishra et al. in J. Metals 51(1), 37 (1999), and metallic glass.

Metals have been treated by a variety of methods to impart superplasticity to enable the formation of small and intricate components. As a general proposition, with aluminum alloys, superplasticity is imparted by treating the metal to yield a fine grain size of less than about 20 microns and high angle grain boundaries.

Bulk metallic glasses are amorphous and exhibit superplasticity in a narrow temperature range, between the glass transition temperature and the crystallization temperature.

Superplastic forming of this invention involves deformation under conditions characterized by low flow stress and high ductility. Components are formed thereby with the material in a glassy state, followed by a post-forming heat treatment to obtain controlled nanostructures. This yields micro components with exceptional mechanical properties.

A bulk superplastic material is forced into a microfabricated die such that the material assumes the shape of the die. In one embodiment the die is an extrusion die with a shaped component exiting the die on the opposite side from which it enters, such that the die has an entry side and an exit side. In another embodiment the die is a cavity into which the material is forced, with the shaped component being ejected from the die or otherwise removed from the die, wherein there is a die wall providing a resisting force directly opposed to the force which plunges the material into the die.

In order for the bulk superplastic material to assume superplastic properties, the invention involves contacting the material with a flat rotating surface of a rotating tool to frictionally heat the superplastic material into the appropriate temperature range where it exhibits superplastic properties. For many bulk superplastic materials, this requires heating to a temperature above the glass transition temperature of the material. The temperature to which the material is heated is below the crystallization temperature, because the superplastic properties of bulk amorphous alloys are significantly reduced with the onset of crystallization.

For a friction stir processed (FSP) Al-4 Mg-1Zr alloy, FIG. 1 shows the variation in ductility of FSP Al-4 Mg-1Zr with test temperature for the initial strain rates of $1\times10^{-2}$ and $1\times10^{-1}$ s$^{-1}$. For comparison, the data of Grimes et al. (Grimes R, Dashwood R J, Harrison A W, and Flower H M. Mater Sci Technol 2000;16:1334.) at $1\times10^{-2}$ s$^{-1}$ are included in FIG. 1. The FSP alloy exhibits significantly enhanced superplasticity at a high strain rate of $1\times10^{-1}$ s$^{-1}$ within the investigated temperature range of 350–550 C. At a low temperature of 350 C, FSP Al-4 Mg-1Zr exhibited a relatively high elongation of 328%. For the same strain rate of $1\times10^{-2}$ s$^{-1}$, elongation of the FSP alloy was much higher than that for the as-rolled microstructure over the entire temperature range. Accordingly, for Al-4 Mg-1Zr alloy the plunging during forming can start after the temperature has reached in the range of 350–550 C.

For a $Zr_{55} Al_{10} Cu_{30}Ni_5$ alloy, which is a bulk metallic glass, the temperature to which the material is heated is between about 682 K (the glass transition temperature, Tg) and about 767 K (the crystallization temperature, Tx) (Saotome et al., Journal of Materials Processing Technology 113 (2001) 64–69). In this case the processing window is about 85 K (Tg–Tx). Similarly, $Pd_{40}Cu_{30}Ni_{10}P_{20}$ alloy must be heated above 577 K (Tg) and below 673 K (Tx) (Saotome et al., Scripta Mater. 44 (2001) 1541–1545.)

Once the frictional heat of the rotating tool heats the material to within its superplastic range, the rotating tool and the die are brought closer together with the material therebetween to plunge the material into the die. This is preferably accomplished by plunging the rotating tool toward the die, but can also be accomplished by moving the die toward the rotating tool. As the die and the rotating tool are brought closer to each other, the bulk superplastic material therebetween takes the shape of the die.

Where the bulk material is reactive to oxygen in air, the forming is carried out in an inert atmosphere. For non-reactive materials, no special atmosphere is required.

In one preferred embodiment, the temperature of the bulk superplastic material is monitored so that the appropriate time for forcing the material into the die can be deteirmined. In particular, the temperature is monitored to determine when the material is comfortably within the superplastic range. The particular method for monitoring the temperature is not critical, and can be achieved, for example, by placing a thermocouple at the interface between the die and the encapsulating material, or by using an optical pyrometer to measure the temperature of the encapsulating material.

In another embodiment, the temperature is not measured directly, but it is known when the superplasticity range is achieved by advance knowledge and experimentation based on a variety of parameters, including the contact time, rotation speed, material characteristics, material thickness, material weight, etc.

The flat surface of the rotating tool is manufactured from materials which are compatible with the superplastic material being deformed. In one embodiment this flat surface is manufactured from tool steel. That the surface is "flat" in the context of this invention means that it is generally planar and has no projecting probes or other significant projections such as those used in friction stir welding as disclosed, e.g., in U.S. Pat. No. 5,460,317.

The rotation speed of the tool is selected to impart the requisite heating to the material with minimum risk of overheating or imparting other damage to the material. In one embodiment, the rotation speed of the tool is between about 300 and about 1500 rpm.

The process involves the formation of one component at a time with a single cavity die or, alternatively, multiple components with a multiple cavity die.

The flat surface of the rotating tool has a surface area which is preferably larger than the surface area of the bulk superplastic material, such that the rotating tool surface more than encompasses the entire surface of the superplastic material.

Figure 2:
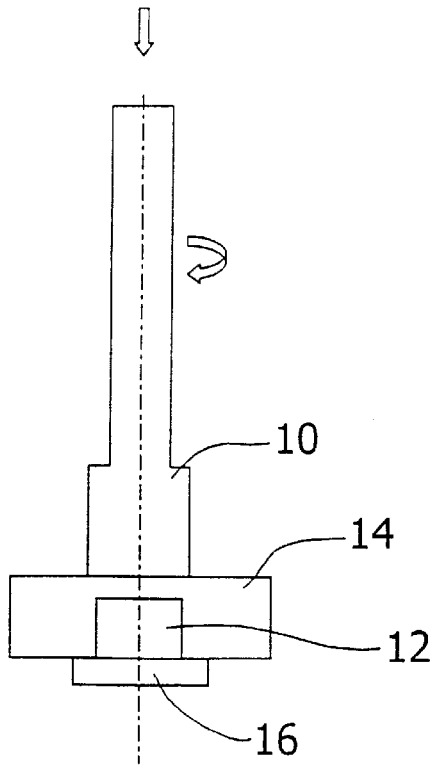
FIGS. 2 and 3 are schematic illustrations of equipment for carrying out the invention.
Figure 3:
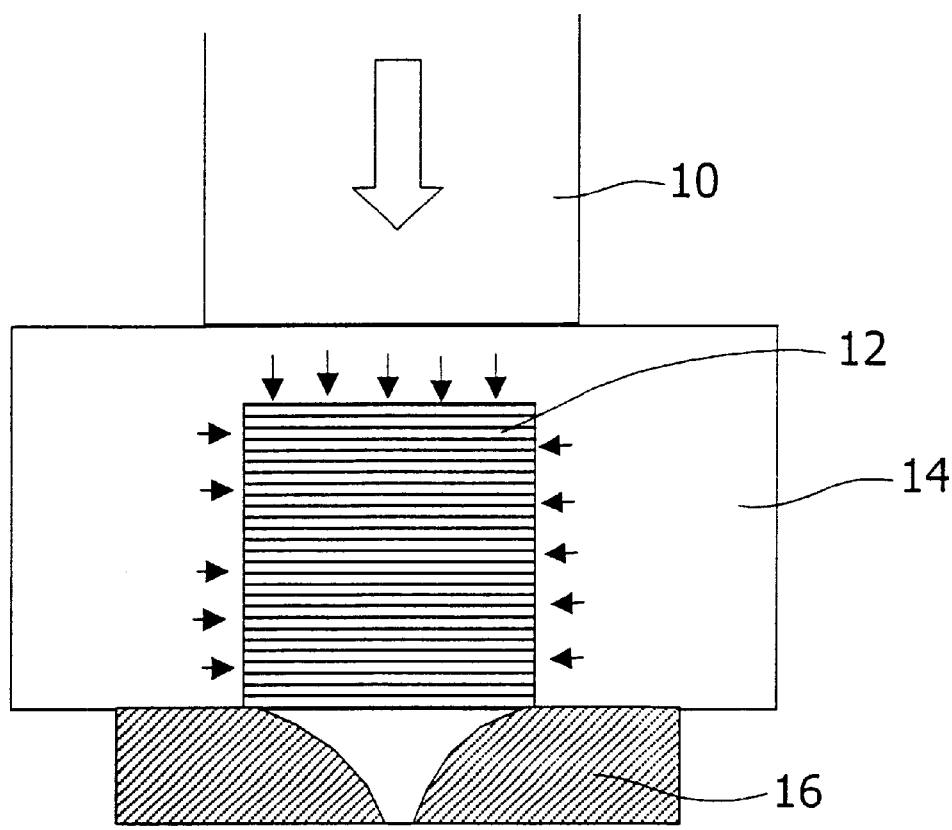
Figure 4:
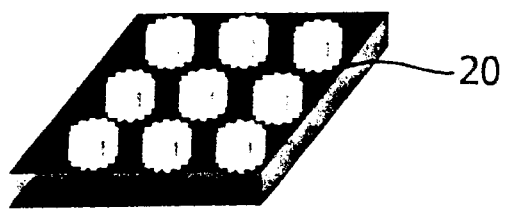
FIG. 4 is a schematic illustration of a multiplecavity extrusion die for carrying out the invention.

FIGS. 2 and 3 schematically illustrate preferred embodiments of the invention employing a containerlesss die of the invention. Plunging tool 10 is rotated to heat the superplastic material 12 to within its superplastic range. The tool actually contacts a metal encapsulating material 14. Heat is transmitted through the encapsulating material to the superplastic material to elevate its temperature to the required range. Once the superplastic temperature is reached, the tool plunges downward on the encapsulating material, thereby transmitting pressure and forcing the superplastic material through the forging or extrusion die 16 (FIG. 2) or extrusion die (FIG. 3). Where it is an extrusion die, an elongate extrusion exits the bottom of the die, and can then be sectioned by micro machining techniques to the required length. Where it is a multiple cavity forging die 20, as in FIG. 4, several components such as micro gears are formed at the same time.

The encapsulating material is selected so that it has a flow strength which is greater than the flow strength of the bulk superplastic material. This aspect produces the squeezing effect illustrated in FIG. 3 in that the encapsulating material is squeezed inward as indicated by the arrows (as well as outward), in response to the downward force of the tool and responsive upward force of the die, as the encapsulating material tries to get out of the way of these forces. As the tool and die move closer, there is a transmission of forces from the tool to the bulk superplastic material in a first direction, shown here as vertically downward, and from the encapsulating material to the bulk superplastic material in a second direction, shown here as horizontal, which second direction is generally perpendicular to the first direction.

In one preferred embodiment the encapsulating material is aluminum, and optionally the same grade aluminum as the bulk superplastic material. In this option the encapsulating material has a greater flow strength than the superplastic material, even though the two are the same grade, because the encapsulating material has not been processed by FSP or other method to impart superplasticity thereto.

In a further variation the encapsulating material and the bulk superplastic material are integral, and in fact part of the same bulk piece of material; for example, a monolithic plate.

The superplastic material consists of a zone within the overall bulk which has been processed by FSP or other method to impart superplasticity to the zone only, and thereby the zone has a lower flow strength than the encapsulating material. In this regard the encapsulating material and superplastic material are integral components of a single blank of material.

An advantage of the process of the invention is that an extrusion die can be used which does not have a substantial wall length above the die. In particular, the invention permits dispensing with a significant confining wall above the die employed in other processes to guide the material into the die. The encapsulating material transmits pressure from the punch to the superplastic material. Also, that the superplastic material is pushed by the encapsulating material significantly reduces the force required to force the material into the die, as frictional forces between the material and a guiding wall in conventional processes are substantially eliminated or reduced. In conventional processes the frictional forces can account for on the order of 50% of the forces which must be overcome, so reduction of these forces constitutes a significant advance.

Though FIGS. 2 and 3 here show the encapsulating material, the method can also be carried out without the encapsulating material, such that the rotating tool directly contacts the bulk superplastic material. The description of the invention as involving frictionally heating bulk superplastic material by frictional contact encompasses the situation where the frictional contact is between the tool and the bulk superplastic material as well as where the frictional contact is between the tool and the encapsulating material. In each instance it is frictionally generated heat which serves to heat the bulk material.

Another advantage of this invention is that deformation is achieved without use of a furnace or other external heat source, other than the frictional heating of the rotating tool.

As a general proposition, the MEMS or other microscale components manufactured according to this invention have an overall weight of less than about 1 gram per component, and no cross section greater than about 2 mm. An exception is with an extrusion, where a long length of material is extruded, though the cross section of the pattern in the extrusion die is typically less than 2 mm. The long extruded length may be subsequently sectioned into components of predetermined thickness or length. The invention therefore involves use of a microfabricated die having an opening through which the bulk superplastic material is forced, which opening has a cross-section of less than about 2 mm.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above methods without departing from the scope of the invention, it is intended that all matter contained in the above description or shown in the accompanying drawing shall be interpreted as illustrative and not in a limiting sense.

What is claimed is:

1. A method for forming a miniaturized shaped component comprising:
    frictionally heating bulk superplastic material with heat generated by frictional contact with a flat rotating surface of a rotating tool, with the bulk superplastic material positioned between the flat rotating surface of the tool and a microfabricated tool die; and
    forcing the bulk superplastic material into the microfabricated die once the bulk superplastic material is heated to a temperature between a glass transition temperature and a crystallization temperature of the bulk superplastic material by moving the tool and die closer to each other with the bulk superplastic material therebetween to produce a miniaturized shaped component conforming to a shape of the microfabricated tool die.

2. The method of claim 1 comprising heat treating the miniaturized shaped component to impart nanocrystalline structure thereto.

3. The method of claim 1 comprising monitoring the temperature of the bulk superplastic material prior to forcing the superplastic material into the die in order to determine when the superplastic material is heated to the temperature between the glass transition temperature and the crystallization temperature.

4. The method of claim 1 wherein the bulk superplastic material is an aluminum alloy.

5. The method of claim 1 wherein the bulk superplastic material has superplastic properties due to friction stir processing.

6. The method of claim 1 wherein the bulk superplastic material is an aluminum alloy having superplastic properties due to friction stir processing.

7. The method of claim 1 wherein the bulk superplastic material is metallic glass.

8. The method of claim 1 wherein the bulk superplastic material is a nanostructured alloy.

9. The method of claim 1 wherein the microfabricated tool die has an opening through which the bulk superplastic material is forced, which opening has a cross-section of less than about 2 mm.

10. A method for forming a miniaturized shaped component comprising:
    frictionally heating bulk superplastic material with heat generated by frictional contact with a flat rotating surface of a rotating tool, with the bulk superplastic material positioned between the flat rotating surface of the tool and a microfabricated tool die; and
    monitoring the temperature of the bulk superplastic material;
    forcing the bulk superplastic material into the microfabricated die once the bulk superplastic material is heated to a temperature between a glass transition temperature and a crystallization temperature of the bulk superplastic material by moving the tool and die closer to each other with the bulk superplastic material therebetween to produce a miniaturized shaped component conforming to a shape of the microfabricated tool die; and
    heat treating the miniaturized shaped component to impart nanocrystalline structure thereto.

11. A method for extruding a miniaturized cross-section component comprising:
    frictionally heat the bulk superplastic material with heat generated by frictional contact with a flat rotating surface of a rotating tool, with the bulk superplastic material positioned between the flat rotating surface of the tool and a microfabricated extrusion die; and
    forcing the bulk superplastic material into the microfabricated extrusion die once the bulk superplastic material is heated to a superplastic temperature range to produce an extrusion with a miniaturized cross section.

12. The method of claim 11 comprising monitoring the temperature of the bulk superplastic material prior to forcing the superplastic material into the die in order to determine when the superplastic material is heated to the superplastic temperature range.

13. The method of claim 11 comprising heat treating the extrusion to impart nanocrystalline structure thereto.

14. The method of claim 11 wherein the bulk superplastic material is a metallic material with superplastic characteristics.

15. The method of claim 11 wherein the bulk superplastic material is metallic glass and the superplastic temperature is between a glass transition temperature and a crystallization temperature.

16. The method of claim 11 wherein the microfabricated tool die has an opening through which the bulk superplastic material is forced, which opening has a cross-section of less than about 2 mm.

17. A method for forming a component of miniaturized cross section comprising:

heating bulk superplastic material by contacting an encapsulating material which encapsulates the bulk superplastic material with a flat rotating surface of a rotating tool to frictionally heat the encapsulating material and thereby heat the bulk superplastic material, with the bulk superplastic material and encapsulating material positioned between the flat rotating surface of the tool and a microfabricated die; and forcing the bulk superplastic material into the microfabricated die once the bulk superplastic material is heated to a temperature between a glass transition temperature and a crystallization temperature of the bulk superplastic material by moving the tool and die closer to each other with the bulk superplastic material therebetween and with the encapsulating material transmitting pressure from the tool to the bulk superplastic material to produce a shaped component of miniaturized cross section conforming to a shape of the microfabricated die.

18. The method of claim 17 comprising heat treating the component to impart nanocrystalline structure thereto.

19. The method of claim 17 comprising monitoring the temperature of the bulk superplastic material prior to forcing the superplastic material into the die in order to determine when the superplastic material is heated to the temperature between the glass transition temperature and the crystallization temperature.

20. The method of claim 17 wherein the bulk superplastic material is an aluminum alloy.

21. The method of claim 17 wherein the bulk superplastic material has superplastic properties due to friction stir processing.

22. The method of claim 17 wherein the bulk superplastic material is an aluminum alloy having superplastic properties due to friction stir processing.

23. The method of claim 17 wherein the bulk superplastic material is metallic glass.

24. The method of claim 17 wherein the bulk superplastic material is a nanostructured alloy.

25. The method of claim 17 wherein the die is an extrusion die which does not have a conventional extrusion die wall and therefore has significantly lower frictional forces between tool and die during extrusion.

26. The method of claim 17 wherein the encapsulating material has a greater flow strength than the bulk superplastic material.

27. The method of claim 17 wherein moving the tool and die closer together results in the transmission of forces from the tool to the bulk superplastic material in a first direction and from the encapsulating material to the bulk superplastic material in a second direction generally perpendicular to said first direction.

28. The method of claim 17 wherein the encapsulating material and the bulk superplastic material are integral components of a single blank of material.

29. The method of claim 17 wherein the microfabricated die has an opening through which the bulk superplastic material is forced, which opening has a cross-section of less than about 2 mm.

* * * * *